United States Patent [19]

Hashimoto

[11] Patent Number: 4,866,754

[45] Date of Patent: Sep. 12, 1989

[54] AUTOMATIC TELEPHONE ANSWERING MACHINE UTILIZING VOICE SYNTHESIS

[75] Inventor: Kazuo Hashimoto, Tokyo, Japan

[73] Assignee: Hashimoto Corporation, Tokyo, Japan

[21] Appl. No.: 291,936

[22] Filed: Dec. 30, 1988

[30] Foreign Application Priority Data

Dec. 30, 1987 [JP] Japan .............................. 62-333732

[51] Int. Cl.⁴ ............................................ H04M 1/65
[52] U.S. Cl. ........................................ 379/68; 379/70; 379/71; 379/79
[58] Field of Search ..................... 379/67, 68, 70, 71, 379/79, 80

[56] References Cited

U.S. PATENT DOCUMENTS 4,608,458  8/1986  Hashimoto ............................ 379/70
4,782,510 11/1988  Szlam ................................... 379/88

Primary Examiner—Robert L. Richardson
Attorney, Agent, or Firm—Becker & Shur Lowe, Price, LeBlanc

[57] ABSTRACT

An automatic telephone answering and recording device, wherein if an incoming call is received when an incoming message tape is full or an owner fails to set the telephone answering device to an automatic answering mode prior to leaving, the telephone line is nevertheless engaged to operate the telephone answering device. Then an outgoing message for answering only, such as "Please call back later", is generated by a voice synthesizer and sent out to a calling party, so that the calling party can understand the situation and know what to do.

2 Claims, 1 Drawing Sheet

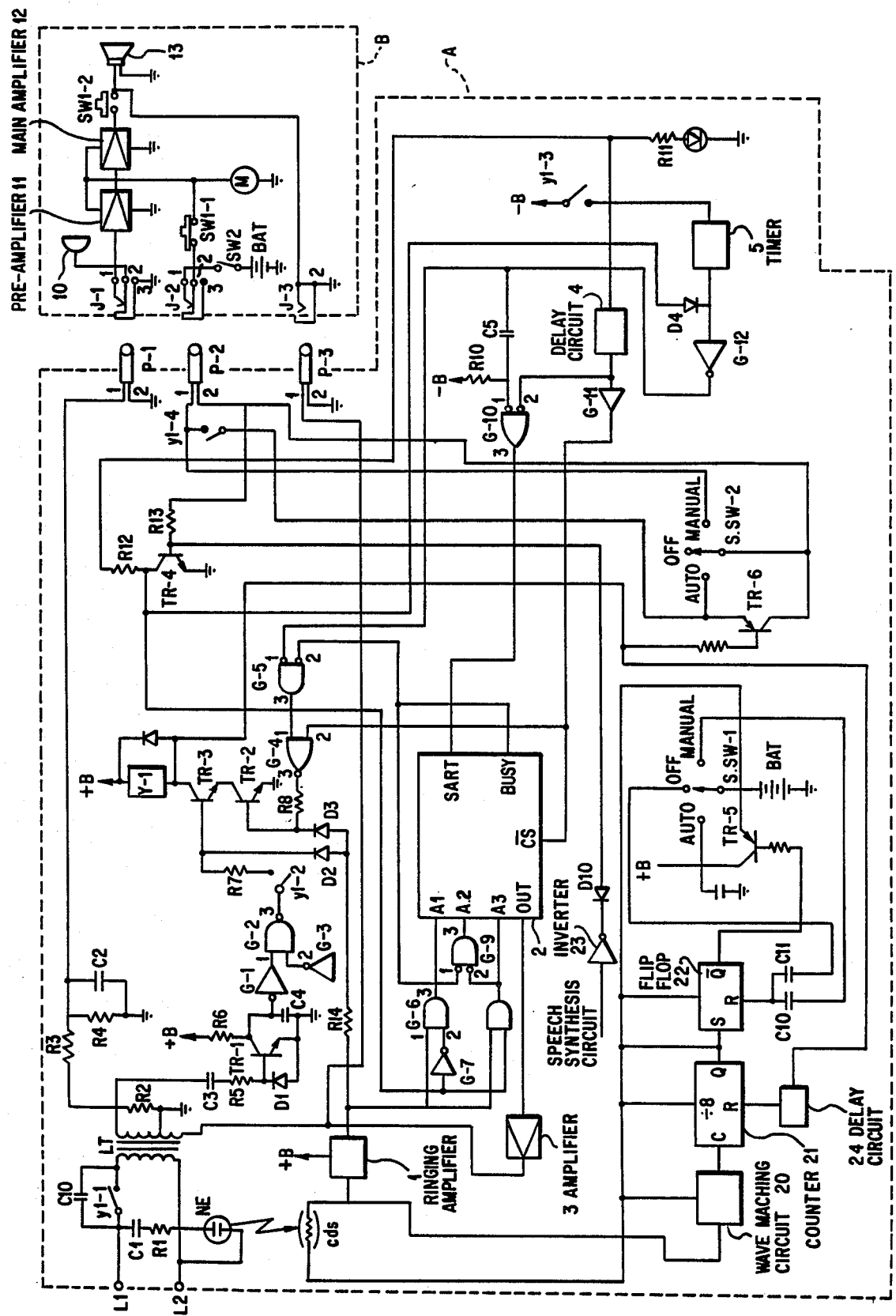

AUTOMATIC TELEPHONE ANSWERING MACHINE UTILIZING VOICE SYNTHESIS

BACKGROUND OF THE INVENTION

The present invention relates to an automatic telephone answering and recording device In a conventional device, such as is disclosed in Japanese patent application No. S63-60948 B2 by the same applicant, when an incoming message tape of an external recorder becomes full, or an owner fails to connect the external recorder to the answering device, a voice element A3 from a voice synthesizer is activated to generate an outgoing message for answering only. However, if the owner fails to set the device to an automatic answering mode, although it is possible to play back the incoming message tape after the device is operated in response to some number of rings according to the device of Japanese patent application No. S42-17452 B1 by the same applicant, it might cause a security problem.

SUMMARY OF THE INVENTION

It is an object of the present invention to provide an automatic telephone answering and recording device wherein, if an incoming message tape is full or an owner fails to set the device to an automatic answering mode prior to leaving when an unspecified calling party calls the device, the telephone line is nevertheless engaged to operate the device and an outgoing message for answer only is sent out to the calling party, so that the unspecified calling party can understand the situation and know what to do.

The above and other objects, features and advantages of the present invention will become more apparent from the following description when taken in conjunction with the accompanying drawing in which a preferred embodiment of the present invention is shown by way of illustrative example.

BRIEF DESCRIPTION OF THE DRAWING

The FIGURE is a circuit diagram explaining the principle of this invention.

BEST MODE FOR PRACTICING THE INVENTION

The arrangement and operation in the preferred embodiment of the present invention will now be described. In the drawing, a section A which is encircled by a dotted line denotes a control section, and a section B which is encircled by a dotted line denotes a recording device which is connected with the control section in the section A. The principle part relating to the invention is described in the control section in the section A and the recording device in the section B. In the section A, reference symbol L1 and L2 denote terminals which are connected to the telephone line. Reference symbol LT denotes a line transformer. Reference symbol NE and cds denote a photo-coupler for detecting a calling signal which is made of a neon lamp and a photo detector. Reference numeral 1 denotes a ringing amplifier for outputting a signal of an H level about for two seconds after a calling signal is called one—three times. Reference numeral 2 denotes a speech synthesis circuit which synthesizes voice segments Reference symbols A1, A2, and A3 denote terminals which designate an address of each voice segment element. Reference symbol cs denotes a chip selecting terminal which keeps the speech synthesis circuit in an active condition. Reference symbol SART denotes a terminal which outputs a corresponding synthesized voice when the terminal A1, A2, or A3 is set to the H level after a message is designated.

For example, when the terminal A1 is designated, a synthesized sentence of "Please leave your message," is output. When the terminal A2 is designated, a synthesized sentence of "Thank you," is output. And when the terminal A3 is designated, a synthesized sentence of "Please call back later," is output. While the corresponding synthesized voice is output, the terminal described by reference symbolic BUSY is kept at H level.

Reference symbols G-6, G-7, G-8, and G-9 denote gate circuits for switching the terminal A1, A2 and A3 in accordance with the condition which will be described later. Reference numeral 3 denotes an amplifier for amplifying a synthesized voice. Reference symbol Y-1 denotes a relay operated by the calling signal, which has four contacts y1-1–y1-4. Reference numeral 4 denotes a delay circuit about for one second which is operated when the contact y1-3 is closed. Reference numeral 5 denotes a timer which can be regulated within from 20 to 60 seconds, for example. Reference symbol TR-1 denotes a detective circuit for detecting that the calling party hung up in operating of the timer 5. Reference symbolic TR-4 denotes a semiconductor switching circuit which is set to OFF, when the end of the incoming message tape of the external recorder, which will be described later, comes or when the external recorder is not connected. Reference numeral 20 denotes a matching circuit which regulates the calling signal for preventing miscount by a counter, which will be described later. Reference numeral 21 denotes a C-MOS type counter, e.g., an MC 14017 offered by the Motorola. This counter outputs the H level from the output terminal Q when "10" is counted, namely when ten calling signals are input.

Reference numeral 22 denotes a R-S type flip-flop which is set to the set condition by the output from the counter 21, and which is reset by the pulse generated by the condenser C10 or the condenser C11 when the operation switch S.SW-1 described later is switched for operating the external recorder, which will be described later. Reference symbol TR-5 denotes a switching transistor for conducting a power supply controlled by the output from the flip-flop. Numeral 23 denotes an inverter. Reference numeral 24 denotes a delay circuit for several seconds which resets the counter 21 after several seconds from the time when the relay Y-1 for closing is set to ON.

Reference symbol S.SW-1 and S.SW-2 denote slide type operation switches. In the slide type operation switches S.SW-1 and S.SW-2, reference symbol AUTO means a position for setting the device to an automatic answering recording mode. Reference symbol OFF means a position of OFF when this device is not used, and reference symbol MANUAL means a position for operating the external recorder, which will be described later. A pushbutton can be substituted for the slide type operation switch.

On the other hand, in the section B, reference numeral 109 denotes an internal microphone. Reference numeral 11 denotes a preamplifier. Reference numeral 12 denotes a main amplifier. Reference numeral 13 denotes a speaker. Reference symbol M denotes a motor. Reference symbol BAT denotes a power supply section. Reference symbol SW1-1 and SW1-2 denote manual operation switches which operate rewinding, playback etc. by a manual operation. The manual operation switches are described only briefly because they are known well.

When the manual operation switches are connected with the control section in the section A and the voice of the calling party is recorded, the manual operation switches must be set to the recording condition. Namely, when rewinding, forwarding and playback of the tape is not operated by a manual operation, the manual operation switches are switched automatically to the recording mode.

Reference symbol SW 2 denotes an automatic restoration switch which opens when the end of the tape (not shown in the drawing) in the recorder arrives. The recorder in section B is connected with the control section in section A through plug P-1, P-2, P-3, and jack J-1, J-2, J-3, and it is possible to be set in the section A.

Operation of the invention will be now described as follows. The control section in the section A is connected with the recorder in the section B. It is assumed that the operation switches S.SW-1 and S.SW-2 are at the position of AUTO, and the end of the tape for incoming message in the recorder has not arrived. In the above condition, when the calling signal is input to the telephone line L1 and L2, the calling signal is detected by the ringing amplifier 1 through the photo-coupler comprised of NE and cds. The output from the ringing amplifier 1 changes to the H level after the calling signals of two or three times are input by the delay circuit (not shown in the drawing) comprised of the condenser and the resistance in the ringing amplifier 1. The transistor TR-2 and TR-3 are set to ON through the diode D2 and D3. As a result, the relay Y-1 is set to ON and the points of contact y1-1–y1-4 are closed. The calling signal stops because a closed circuit is formed by the contact y1-1 through the primary winding of the line transformer LT.

The H level on the terminal 3 of the NAND gate G-2 is input to the base of the transistor TR-3 through the resistance R7 by the contact y1-2 The power supply +B is connected with the delay circuit 4 by the contact y1-3. After one second, the output side of the delay circuit 4 changes to the H level, and the chip selecting terminal cs of the speech synthesis circuit 2 is set to the L level through the inverter G-11, and also the speech synthesis circuit 2 is set to the possible condition for operation. The output side of the delay circuit 4 is at the L level before the chip selecting terminal cs is set to the L level; accordingly, the H level signal is output previously to the START terminal through the terminal 2, 3 of the NOR gate G-10. As a result, the voice which is designated and synthesized by the address terminals A1, A2 and A3, is output from the OUT terminal, when the chip selecting terminal cs is set to L level.

The integrated circuit (IC) in the speech synthesis circuit which is used in this device is provided to output a synthesized voice by inputting the H level signal to the START terminal after the chip selecting terminal cs is set to L level. The contact y1-4 is set to ON, and as a result, the terminals 1, 2 of the plug P-2 are short-circuited and the terminal 1, 2 of the jack J-2 of the side of the recorder in the section B are short-circuited. As a result, the affirmative voltage from the power supply BAT is input to the motor M through the switch SW1-1 and the incoming message tape is driven.

At the same time, the affirmative voltage from the power supply BAT is input to one side of the resistance R13 through the jack J-2 and the plug P-2, and the transistor TR-4 is set to ON. As a result, the collector side of the transistor TR-4 is set to the L level, and the L level is applied to the terminal of the AND gate G-6 through the terminal 2 of the AND gate G-8 and the inverter G-7.

On the other hand, the terminal 1 of the inverter G-6, and the terminal 1 of the AND gate G-8 are connected to the output side of the ringing amplifier 1. Even if the calling signal stops, the output side of the ringing amplifier is kept at the H level for about two seconds for discharging the condenser of the delay circuit in the ringing amplifier 1. As a result, as described in the drawing, the terminal 1 and 2 of the AND gate G-6 are set to the H level at the same time, the terminal 3 of the AND gate G-6 is set to the H level, and the address terminals A2 and A3 are set to the L level. Accordingly, the voice synthesized corresponding to the address terminal A1, "Please leave your message", for example, is output from the OUT terminal, is amplified by the amplifier 3, and is sent to the calling party through the line transformer LT.

When the output from the inverter G-11 is set to the L level as in the above explanation, the terminal 2 of the NOR gate G-4 is set to the L level, and the terminal 3 of the NOR gate G-4 is set to the H level. As a result, the bias is input to the base of the transistor TR-2 through the resistance R8. As in the above explanation, the bias is input to the base side of the transistor TR-3 through the resistance R7. Accordingly, even if the output from the ringing amplifier 1 returns to the L level after about two seconds from the time when the calling signal stops by closing, the relay Y-1 can be kept in the present condition continuously. As in the above explanation, after the synthesized voice corresponding to the address terminal A1 is sent, the message from the calling party input through the telephone line is recorded on the incoming message tape through the line transformer LT, the resistance R3, the plug P-1, the jack J-1, the preamplifier 11, and the recording circuit (not described in the drawing because it is well known).

When the calling party hangs up the phone before the timer does not finish counting the time set previously, the pulse appearing in the telephone line by hanging up the phone is input to the transistor TR-1 through the line transformer LT. While the pulse is input to the transistor TR-1, the transistor TR-1 is set to ON. The terminal 1 of the NAND gate G-2 changes to the H level by setting the transistor TR-1 to ON through the inverter G-1. At this time, the BUSY terminal is to the L level because the synthesized voice is not output from the speech synthesis circuit 2. The terminal 2 of the NAND gate G-2 is kept at the H level by the inverter G-3, and accordingly, the terminal 3 of the NAND gate G-2 is set to the L level, and the bias input to the base of the transistor TR-3 is terminated through the contact y1-2 and the resistance 7. As a result, the transistor TR-3 is set to OFF, the relay Y-1 is restored, and this device is returned to the waiting condition.

On the other hand, when the calling party continues to talk even after the timer 5 counts 30 seconds for example, the terminal A2 of the speech synthesis circuit 2 is activated, and the ending message corresponding to the address terminal A2, "Thank you", for example, is output. Namely, the output from the ringing amplifier 1 has already disappeared, as in the above explanation;

accordingly, the terminals 1 of the AND gates G-6, G-8 are at the L level, the terminals 3 of the AND gates G-6, G-8 are at the L level, the terminals 1, 2 of the NAND gates G-9 are at the L level, the terminals 3 of the NAND gates G-9 are at the H level, and the terminal A2 of the speech synthesis circuit 2 is set to the H level. In this condition, when the timer 5 finishes counting the time set previously, the output side of the timer 5 is set to the H level, and the output from the inverter G-12 is set to the L level. As a result, the terminal 1 of the NOR gate G-10 is set to the L level for an instant by the negative pulse from the condenser C5, and the H level pulse from the terminal 3 of the NOR gate G-10 is input to the START terminal of the speech synthesis circuit 2. The ending message corresponding to the address terminal A2 is output, and the end of recording operation of this device is informed of the calling party. The relay Y-1 is kept in the closed condition in order to reliably output the entire ending message. Namely, when the timer 5 finishes counting the time set previously, the terminal 1 of the NAND gate G-5 is set to the L level, as above.

On the other hand, the BUSY terminal of the speech synthesis circuit 2 is set to the H level for outputting the ending message as above. As a result, when the H level voltage is input to the terminal 2 of the NAND gate G-5, the terminal 3 of the NAND gate G-5 is at the L level, the terminal 1 of the NOR gate G-4 is at the L level, the terminal 3 of the NOR gate G-4 is at the H level, and the bias is input to the base of the transistor TR-2 through the resistance R8, and the relay Y-1 is kept in a closed condition. When the output of the ending message is finished, the BUSY terminal is set to the L level. As a result, the terminal 1, 2 of the NAND gate G-5 are set to the L level, the terminal 3 of the NAND gate G-5 is set to the H level, the terminal 1 of the NOR gate G-4 is set to the H level, and the terminal 3 of the NOR gate G-4 is set to the L level. As a result, the bias to the base of the transistor TR-2 is terminated, the relay Y1 is restored, and this device returns to the waiting condition.

In recording the voice of the calling party, when the end of the incoming message tape (not shown in the drawing) in the recorder in the section B arrives, this device is restored after the ending message of the terminal A2 of the speech synthesis circuit 2 is output, which will be described later. Thereafter, when the device receives the signal, the exclusive answering message corresponding to the address terminal A3 of the speech synthesis circuit 2 is output. Namely, when the end of the tape arrives in the recording operation, the automatic restoration switch SW 2 opens. As in the above explanation, the voltage is not input to the one side of the resistance R13 through the jack J-2 and the plug P-2, and as a result, the transistor TR-4 is set to OFF, the timer 5 is charged quickly through the resistance R12 and the diode D4, and counting by timer 5 is cut off. Accordingly, the device is restored after outputting of the ending message from the address terminal A2 of the speech synthesis circuit is finished as the timer 5 finishes counting.

With respect to the signal which is received after the above condition is set, while the H level is output from output side of ringing amplifier 1 about for two seconds as above, after the device is set to the closed condition by the calling signal, namely, while the terminals 1 of the AND gates G-6, G-8 are set to the H level, the H level voltage from the transistor TR-4, which is in OFF, is input to the terminal 2 of the AND gate G-8, the terminal 3 of the AND gate G-8 is set to the H level, and the terminal A3 of the speech synthesis circuit 2 is selected. In this condition, the chip selecting terminal cs is set to the L level through the delay circuit 4 and the inverter G-11.

The START signal has been already given as above, and the exclusive answering message, corresponding to the address terminal A3, is output in this condition. The timer 5 finishes counting the timer set previously, and as a result, the exclusive answering message, "Please call back later" for example, corresponding to the address terminal A3, is output. Thereafter, the device is restored at once to the waiting condition as when the end of the tape arrives, and this operation is returned for each receiving signal.

When the external recorder in section B is not connected, operating such as that when the signal is received after the end of the tape comes, is carried out. Namely, after the synthesized exclusive answering message, corresponding to the address terminal A3 for each receiving signal is output, the device is restored and this operation is repeated for each receiving signal.

On the other hand, the operation in the condition where the owner goes out, leaving the operation switch set to OFF and not set to AUTO, and the owner notices this condition, will be described as follows. First, the owner calls the device through the nearest public phone. When the operation switch S.SW-1 is set to OFF, the voltage +B from the battery BAT is not supplied to the ringing circuit 1, but is always supplied to the matching circuit 20, the counter 21 and the flip-flop 22. Accordingly, the calling signal is counted by the counter 21 through the neon lamp NE, and the photo detector cds and the matching circuit 20. When the Q output of the counter 21 is set to the H level by counting 10, for example by the counter 21, the flip-flop 22 is set, and the switching transistor TR-5 for the power supply is set to ON by the output Q from the flip-flop 22. Accordingly, the voltage +B is supplied to each circuit through the transistor TR-5. The ringing amplifier 1 is set to the condition where it is possible to be operated. As a result, the relay Y-1 is set and the telephone line L1 and L2 are set to the closed condition by the calling signals of two- three times (total 12–13 times) input in succession. When the closed condition is set through the counter 21 above, the transistor TR-4 is set to OFF because the base of the transistor TR-4 is grounded through the inverter 23 and the diode D10. Accordingly, the address A3 of the speech synthesis circuit 2 is activated and "Please call back later" as the message is output. This is because the terminal 2 of the AND gate G-87 is set to the H level and the terminal 1 of the AND gate G-8 is set to the H level by the calling signal, as the condition where the end of the incoming message tape arrives.

The owner listens to the above message and the phone is set on-hook by the owner. As a result, the device is restored as in the above explanation.

The counter 21 is reset after several seconds from the time when the relay Y-1 is set to ON through the delay circuit 24. But the flip-flop 22 is kept in the setting condition, and accordingly, the voltage +B is supplied to each circuit through the switching transistor TR-5 for the power supply. As a result, when the calling signal from the third party is received, the telephone line can be closed by the output from the ringing amplifier 1. When the end of the incoming message tape (not shown in the drawing) does not come as in the above explanation, the incoming message tape is driven through the switching transistor TR-6 and the contact y1-4. In this condition, the address terminal A1 of the speech synthesis circuit 2 is activated because the transistor TR-4 is set to ON and the corresponding message is sent. When the owner who returns home switches the operation switch S.SW-1 from the position of OFF to the position of MANUAL for operating the external recorder the flip-flop 22 is reset by the pulse from the condenser C10.

As the above explanation, in the conventional telephone answering device, when the end of the incoming message tape arrives, or the incoming message tape is not driven because it is out of order or the setting of the telephone answering device has failed to be set, the common exclusive answering message selected in the speech synthesis circuit can be sent after the telephone answering device is set to the closed condition by calling from outside. It is possible to confirm sufficiently the condition of the telephone answering device when many and unspecific persons call the telephone answering device, so that the practical effect of the present forwarding device is increased.

The foregoing description of the preferred embodiment of the invention has been presented for purposes of illustration and description and is not intended to be exhaustive or to limit the invention to the precise forms disclosed, since many modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with full breadth to which they are legally and equitable entitled.

What is claimed:

1. An automatic telephone answering and recording device comprising;
   a relay circuit for detecting a calling signal of an incoming call and forming a loop circuit;
   a voice synthesizing circuit which is activated in response to closing of a relay contact of said relay circuit;
   a gate circuit for successively sending out, in a specified order, outgoing messages A1, A2 and A3 generated by said voice synthesizing circuit;
   means for recording a calling party's message after the loop circuit is formed upon detection of the calling signal and then the outgoing message A1 is sent out, thereafter sending out the outgoing message A2 for terminating the call, and returning the device to a standby mode;
   first circuit means for sending out said outgoing message A3 for answering only upon receiving of an incoming call after the capacity of a recording medium of said recording means is full;
   second circuit means for operating the device after a predetermined number of rings if a user calls the device from an outside telephone when he fails to set the device to an automatic answering mode prior to leaving, and then sending out same outgoing message as said A3; and
   control means for sending out said outgoing messages A1, A2 and A3 in the specified order according to each status even if the next incoming call is received immediately after an on-hook operation during sending of said messages A1, A2 and A3.

2. An automatic telephone answering and recording device, according to claim 1, wherein if an incoming message tape is still full after said answering device sends out the outgoing message A3 for answering only and then returns to the standby mode, the same message A3 is sent out in response to next incoming call, and if the incoming message tape does not reach its tape end, the usual messages A1 and A2 of the telephone answering device are sent out in response to the next incoming call.

* * * * *